United States Patent

[11] 3,599,279

| | | |
|---|---|---|
| [72] | Inventor | David I. McDonald<br>Cincinnati, Ohio |
| [21] | Appl. No. | 21,252 |
| [22] | Filed | Mar. 20, 1970 |
| [45] | Patented | Aug. 17, 1971 |
| [73] | Assignee | The Cincinnati Milling Machine Co.<br>Cincinnati, Ohio |

[54] CLAMPING MECHANISM
10 Claims, 5 Drawing Figs.

[52] U.S. Cl. .................................................. 18/30 LT,
18/16 T, 18/43, 29/200, 29/434, 72/451
[51] Int. Cl. .................................................. B29f 1/00,
B30b 1/10
[50] Field of Search .......................................... 18/16 T, 30
LC, 30 LE, 30 LF, 30 LM, 30 LT, 43

[56] References Cited
UNITED STATES PATENTS

| 2,113,115 | 4/1938 | MacMillin et al. | 18/30 LT UX |
| 2,666,230 | 1/1954 | Sherman | 18/30 LM |
| 3,015,131 | 1/1962 | Hehl | 18/30 LT |
| 3,327,622 | 6/1967 | Lebovitz | 18/30 LT X |

*Primary Examiner*—J. Howard Flint, Jr.
*Attorneys*—Howard T. Keiser and Alfred J. Mangels ABSTRACT: A hydraulically actuated clamping mechanism for moving a movable member into and out-of-cooperative relationship with a stationary member. A pair of rigid link arms is pivotally interconnected at one end of each of the arms to form a toggle. The free end of one of the toggle arms is pivotally connected to a stationary portion while the free end of the other arm is pivotally connected to a movable member. The pivotally interconnected ends of the toggle arms define a knee-type joint which incorporates an integral hydraulic rotary actuator which upon the application of hydraulic pressure, causes relative motion between the arms and thereby moves the movable member into and out of cooperative relationship with the stationary member.

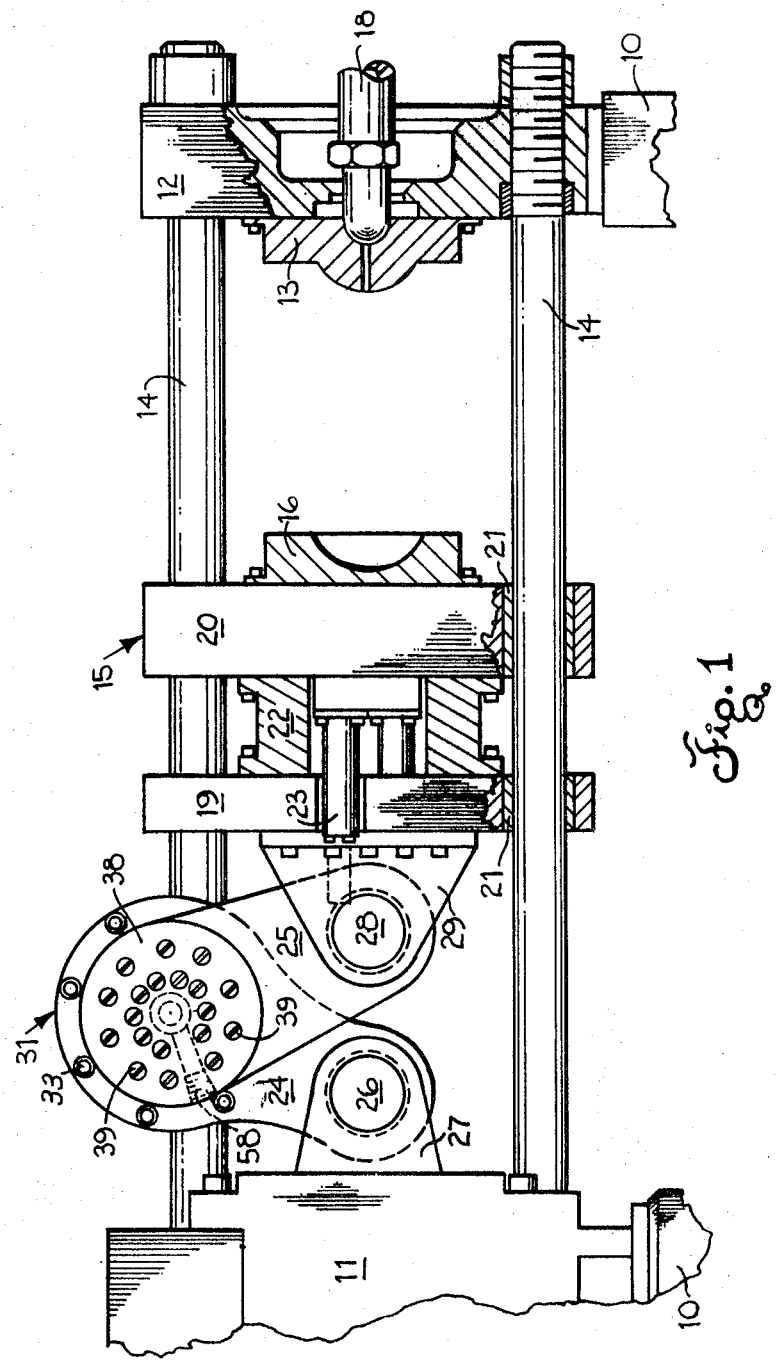

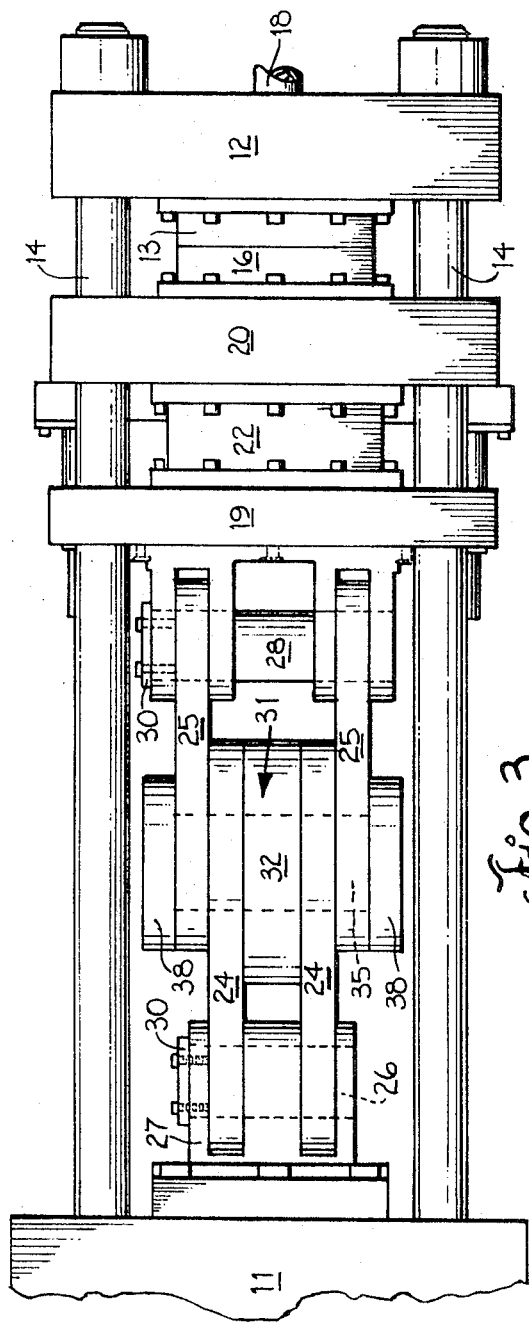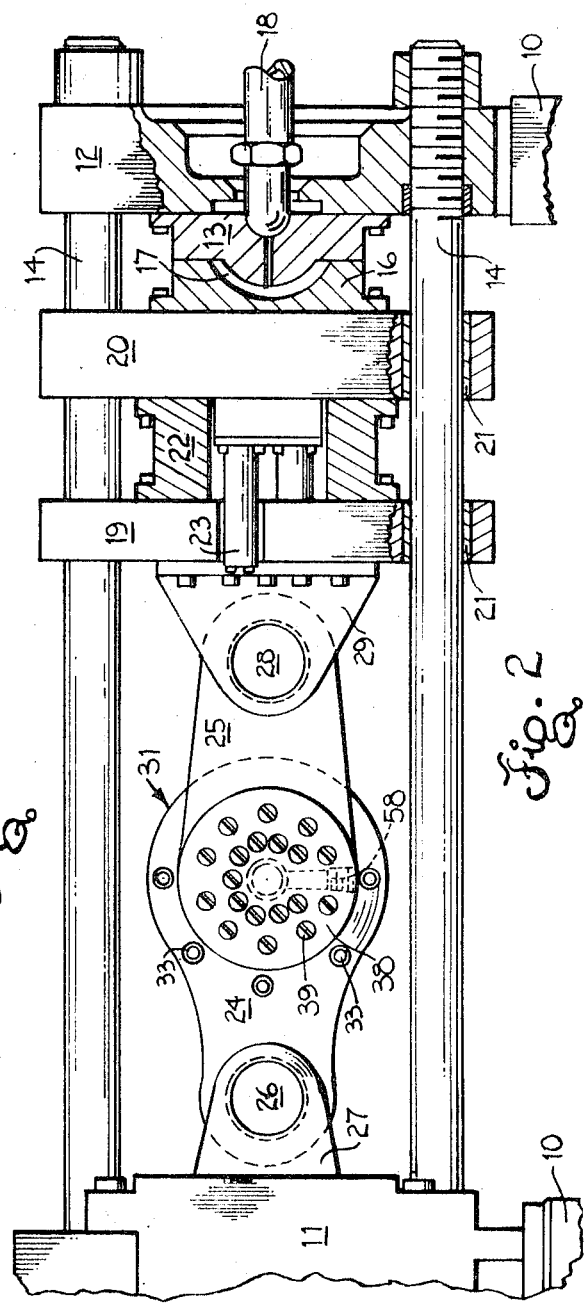

3,599,279

CLAMPING MECHANISM

BACKGROUND OF THE INVENTION

This invention relates to hydraulically operated clamping devices and more particularly to a hydraulically operated clamp device particularly adapted to provide rapid opening and closing of a mold and incorporating a rotary hydraulic actuator at the knee of the toggle.

In clamping devices associated with molding machines such as, for example, die casting machines and plastics molding machines of various types, a split mold or die is frequently utilized to define the shape of the article to be formed and, therefore, it is necessary to open and close the die or mold at periodic intervals to permit removal of the cast or molded article. This opening and closing operation is desirably performed rapidly so as to permit the manufacture of a large number of parts within a given time period. In order to minimize the time necessary to complete a given opening and closing cycle, it is necessary that the closing and opening velocities of the mold be high or that the distance between the molds be small. However, for a given mold the separation distance between the mold portions is generally fixed and thus the closing and opening velocities are the only remaining variables. It is also desirable that the final velocity of the moving mold portion with respect to the stationary mold portion be small so that when contact occurs the impact force which results is minimal and thus does not cause damage to the mold. A desirable mechanism for imparting the desired motion to the moving mold member is a so-called toggle-type link wherein a pair of link members is pivotally interconnected at one end thereof and has its opposite ends pivotally connected to a stationary member and to the moving mold member, respectively. Such a mechanism results in a substantially sinusoidal velocity profile in that when the link members are overlapped the velocity imparted to the moving element is very high, while after the toggle is opened substantially such that the included angle between the link members is large, the closing velocity tends to decrease up to the point where the toggle is completely extended whereupon the velocity is zero. Preferably, the molds are in firm contact at the point where the toggle is completely extended in order to prevent flashing of the molded material from the mold cavity.

To actuate the above-described toggle-type linkage systems, it has been the practice to employ a linear hydraulic cylinder having its axis substantially perpendicular to the path of travel of the moving mold member so that a force is applied at the knee of the toggle tending to force the toggle arms apart and thus impart motion to the movable mold member. That approach, however, requires a relatively high capacity hydraulic cylinder because initially the principal component of the force is acting in a direction which is at right angles to the desired path of travel of the movable mold. Additionally, because of the perpendicular orientation of the cylinder, a large transverse load is applied to the various interconnections of the link system, which causes the movable platen to bear against the tie rods upon which it is slidably carried and thus tends to cause rapid wear on the bearing surfaces of the platen which bear against the tie rods. In addition, the side load tends to cause deflection in the tie rods, which is highly undesirable, and thus requires that stronger tie rods be utilized in order to resist the transverse deflection imposed by the perpendicularly applied forces.

It is an object of the present invention to obviate the above-described difficulties.

SUMMARY OF THE INVENTION

Briefly stated, in accordance with one aspect of the present invention, a link-type clamping mechanism is provided between a stationary member and a movable member spaced therefrom. The mechanism comprises a pair of link members pivotally interconnected at one end thereof to form a knee joint and having their opposite ends pivotally connected to said stationary member and said movable member, respectively. Oppositely directed torques are applied to the end of each of the lines at the knee joint to thereby impart linear motion to the movable member and also to avoid the imposition of excessively large loads perpendicular to the direction of travel of the movable member. The oppositely directed torques are provided by a rotary hydraulic actuator positioned at the knee joint.

BRIEF DESCRIPTION OF THE DRAWINGS

FIG. 1 is a fragmentary side view, partially in section, showing the clamping mechanism of the present invention as applied to an injection molding machine to impart motion to the movable platen thereof.

FIG. 2 is a fragmentary elevational view, partially in section, showing the clamp mechanism of FIG. 1 in its fully extended position.

FIG. 3 is a fragmentary top view of the device shown in FIG. 2.

DESCRIPTION OF THE PREFERRED EMBODIMENTS

Figure 4:
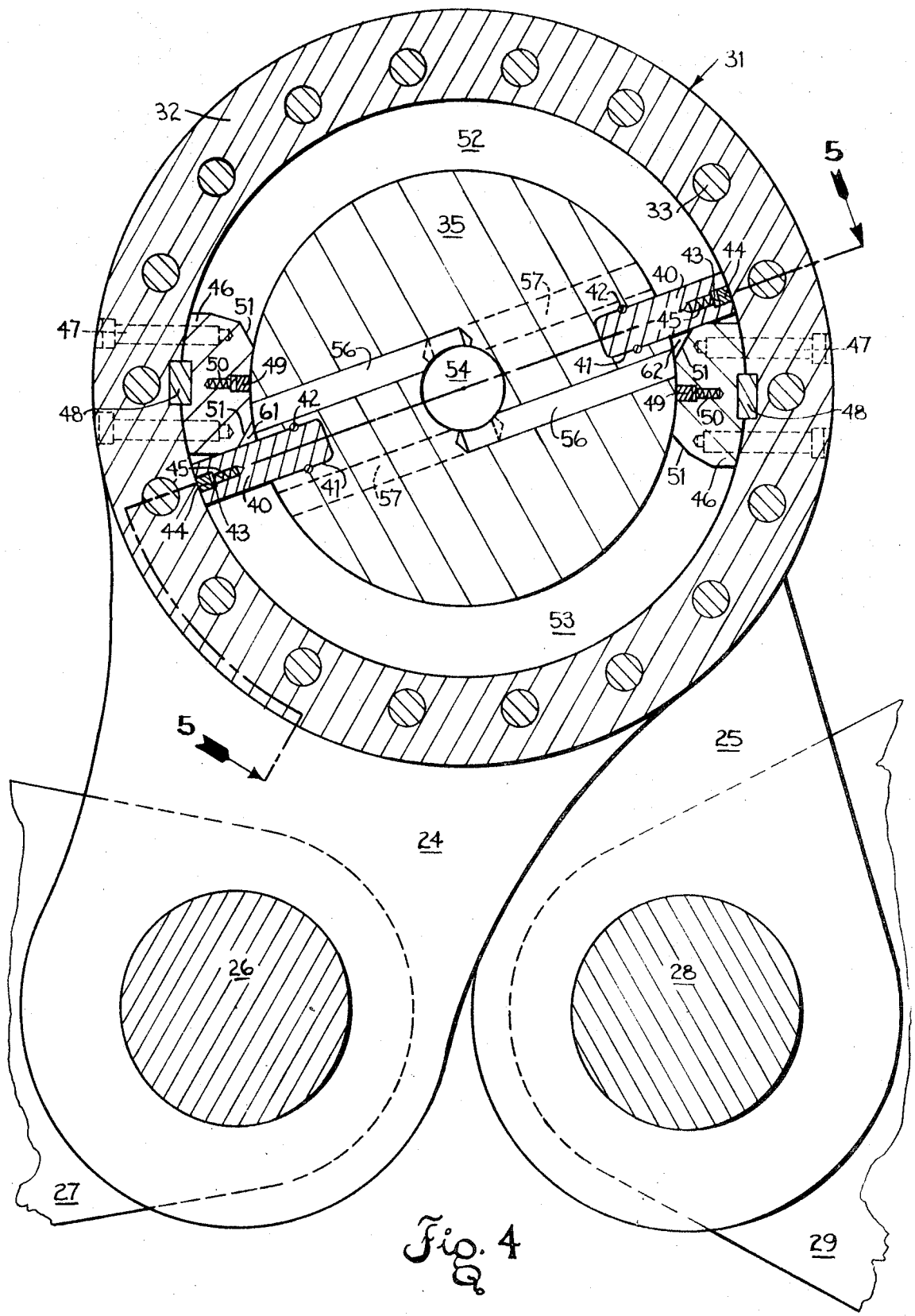
FIG. 4 is a longitudinal cross-sectional view through the link arms showing the structural arrangement thereof at the point at which the arms are interconnected.

Referring now to the drawings and particularly to FIG. 1 thereof, there is shown the clamp and mold section of an injection molding machine. The machine includes a base 10 on which is positioned a stationary support 11 and a stationary platen 12 spaced from stationary support 11 and to which is attached a stationary mold member 13. A plurality of tie rods 14 are attached to both stationary support 11 and stationary platen 12 and extend therebetween in substantially parallel, spaced relationship. A movable platen 15 is slidably positioned on tie rods 14 between stationary support 11 and stationary platen 12 and carries a cooperating movable mold member 16 which is adapted to engage with stationary mold member 13 to define a mold cavity 17 (see FIG. 2). An injection nozzle 18 is provided to conduct the material to be molded into mold cavity 17. The construction of injection nozzle 18 and the injection system of which it is a part are well known to those skilled in the art and, therefore, will not be further described herein.

Movable platen 15 can comprise a pair of spaced plates 19, 20 having their faces in parallel relationship and being slidably positioned on tie rods 14. Plates 19 and 20 can include bearing surfaces 21 which contact tie rods 14 and reduce friction and wear therebetween. A spacer 22 of desired axial extent can be interposed between plates 19 and 20 to compensate for the thickness of the various molds which can be secured to fixed platen 12 and movable platen 15. Additionally, a hydraulically operated knockout system can be employed to dislodge the molded piece from movable mold member 16. As shown, the knockout system can comprise one or more hydraulic cylinders 23 utilized to move a plurality of ejector pins (not shown) which are positioned within movable mold member 16 and to eject the completed part therefrom upon the conclusion of the molding cycle. Such ejection systems are well known to those skilled in the art and, therefore, will not be described in detail herein.

The link mechanism of the present invention is shown in FIGS. 1, 2, and 3 and comprises two pairs of link arms 24, 25 interconnected at one end thereof to provide a toggle-type arrangement. The free end of one pair 24 of link arms is pivotally connected to stationary support 11 by means of a pin 26 which is carried by a clevis 27 attached to the stationary support. Similarly, the other pair of link arms 25 is pivotally connected to the rearmost portion 19 of movable platen 15 by means of a pin 28, which is carried by a clevis 29 secured to the rearmost portion 19 of movable platen 15. Each of the pins 26, 28 can be secured against endwise motion by means of end caps 30 bolted thereto as shown more clearly in FIG. 3. Alternatively, other retaining means could also be used, such as, for example, retaining rings (not shown) or an interference fit between the pins and the respective clevises, or the like. In any event, it is only necessary that link arms 24, 25 be pivotable about the pins 26, 28 and whether or not pins 26, 28 are movable within clevises 27, 29, respectively, is a matter of choice.

The clamp system of the present invention is shown in FIG. 1 with the mold members 13 and 16 in the open position and the toggle retracted to a point in its path of travel such that the resulting included angle between link arms 24 and 25 is small. To close the mold and bring link arms 24 and 25 to the position shown in FIG. 2 it is necessary that a force be applied to the toggle forcing link arms 24 and 25 apart, whereupon the motion of the arms causes movable platen 15 to move linearly along tie rods 14 into cooperative relationship with stationary platen 12 so that the mold portions are in contact and thus define mold cavity 17.

When the mold is closed and the toggle is in the fully extended position as shown in FIGS. 2 and 3, the material to be molded may be injected into the mold cavity through an aperture in stationary mold member 13 to form the article desired. During the injection phase of the cycle, the material to be molded must of necessity be injected under high pressure since it frequently is a viscous material such as, for example, a molten polymer, and the high pressure is necessary to cause the same to flow. However, the high pressure necessary to inject the material also results in forces within mold cavity 17 tending to separate mold members 13 and 16, and thus it is necessary that link arms 24 and 25 be made sufficiently strong so that they will resist the axial load imparted thereto as a result of the pressure of the injected molding material and preclude separation of mold members 13 and 16. When mold cavity 17 has been filled and the molded article has solidified, the toggle is retracted and is again brought to the position shown in FIG. 1, in which movable platen 15 is spaced from stationary platen 12 and the completed part can then be ejected from the mold cavity by means of the ejection system shown generally in FIGS. 1 and 2.

The link toggle system of the present invention incorporates an integral, rotary hydraulic actuator 31 at the knee of the toggle or the point at which link arms 24 and 25 are interconnected. Actuator 31 is shown in cross section in FIGS. 4 and 5. As shown, link arms 24, which are pivotally connected to clevis 27 secured to stationary member 11, are spaced transversely and between them is positioned an annular closure ring 32, which is securely held between the link arms 24 as by means of, for example, bolts 33. Each of the link arms includes an aperture 34 (see FIG. 5) which is coaxial with annular ring 32. Positioned within those apertures is a pin 35 which outwardly beyond the outermost faces of link arms 24 and also passes through corresponding apertures 36 in link arms 25 to provide the pivoted connection therebetween.

Pin 35 is of generally cylindrical shape, with an outer diameter corresponding to the diameter of apertures 34 and 36, and includes a coaxial, stepped portion 37 of greater diameter positioned substantially centrally along the axis of pin 35. Stepped portion 37 extends axially along pin 35 a distance corresponding to the spacing between the innermost surfaces of link arms 24 and extends radially beyond apertures 34 to define a substantially fluidtight annular channel bounded by the outermost surface of stepped portion 37, the innermost surface of annular ring 32, and the innermost surfaces of link arms 24. Pin 35 has an end cap 38 bolted to each end thereof, which end cap is also secured to link arms 25, as by means of bolts 39. Thus, both the outermost link arms 25 and the innermost link arms 24 are pivotally interconnected by means of pin 35.

Extending from the outermost surface of stepped portion 37 of pin 35 and into the annular channel formed between pins 35 and ring 32 are a pair of oppositely disposed vane members 40, which are retained in slots 41 in pin 35 as by means of dowel pins 42. Each vane 40 includes a transverse slot 43 at its outer end to receive a sealing strip 44, which is spring biased by springs 45 into contacting relationship with the inner surface of annular ring 32.

Also extending within the annular chamber defined by the outermost surface of stepped portion 37 of pin 35 and annular ring 32 is a pair of oppositely disposed abutments 46, which are secured to annular ring 32 as by means of bolts 47 and are secured against rotation within the channel by key members 48. As was the case with vanes 40, abutments 46 also include transverse slots within which sealing strips 49 are positioned and spring biased by means of springs 50 to bear against the outermost surface of stepped portion 37 of pin 35. Additionally, abutments 46 include inwardly directed chamfers 51 positioned transversely and located between the sides and innermost surface of abutments 46. The purpose of chamfers 51 will be explained hereinafter. It can thus be seen that abutments 46 divide the annular chamber into a pair of substantially equal, arcuate chambers 52, 53, which are swept by vanes 40 when pin 35 is caused to rotate with respect to annular ring 32.

Pivot pin 35 includes a pair of bores 54, 55, coaxial therewith which extend partially within pin 35 without meeting. Extending tangentially from the innermost terminus of each of the axial bores 54, 55 are a pair of oppositely disposed, parallel channels 56, 57, respectively, in communication with chambers 61, 62, which, as shown in FIG. 4, are of substantially triangular cross section and are defined by chamfers 51 of abutments 46, vanes 40, and the outermost surface of stepped portion 37 of pivot pin 35. A tangential bore 58, 58a is provided in each of end caps 38 and terminates at the center thereof to cooperate with an axial bore 59, 59a, respectively, which is in aligned relationship with axial bores 54 and 55, respectively, in pivot pin 35. Sealing rings 60 are provided to prevent leakage of hydraulic fluid along pin 35.

Figure 5:
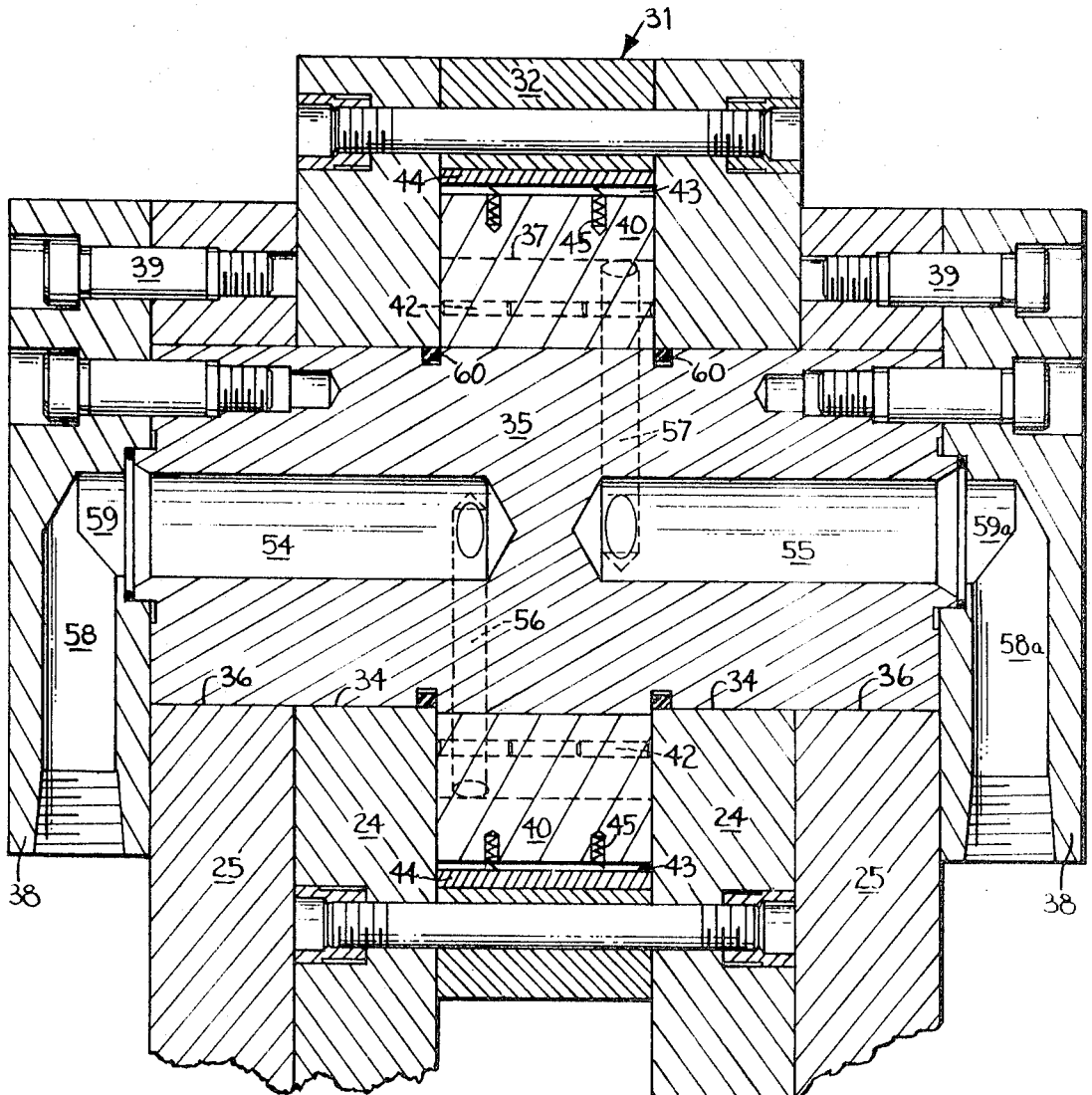
FIG. 5 is a fragmentary cross-sectional view taken along the line 5–5 of FIG. 4.

It can thus be seen that communication is established between chamber 61 and one side of the toggle assembly through channels 56, and bores 54, 59, and 58. When hydraulic pressure is applied through bores 58, 59, and 54 to the left side of the assembly as shown in FIGS. 5, the pressure is transmitted through channels 56 to both chambers 61 and 62. At the same time, the right side of the assembly as shown in FIG. 5, bores 58a, 59a and 55, and channels 57 are vented to a hydraulic reservoir through a suitable hydraulic circuit (not shown). The pressure in chambers 62 and 61, since it is greater than that in arcuate chambers 52 and 53, acts against vanes 50 and thus causes pivot pin 35 to rotate with respect to annular ring 32. The torque of rotation is dependent upon the vane area and the pressure differential which exists across the vane. Rotation will continue until either the pressure differential is reduced to zero or the vanes have swept an arc of slightly less than 180° and have contacted the opposite abutments 46. Similarly, rotation in the reverse direction can be accomplished by interchanging the hydraulic connections by means of a suitable valve (not shown) such that bores 58a, 59a, and 55 are pressurized and bores 58, 59 and 54 are vented to the hydraulic reservoir (not shown).

It can thus be seen that the application of hydraulic pressure to one of tangential bores 58 or 58a will cause the toggle arms to move with relation to each other in one direction while imparting pressure to the other tangential bore will cause the toggle arms to move with respect to each other in an opposite direction. It is thus apparent that the knee joint of the toggle comprises an integral rotary hydraulic actuator to impart a torque to each of the toggle arms and thus cause the same to open or close, thereby also causing the movable platen to move forward or back and, in turn, causing the mold members to either open or close.

By applying the motive force which actuates the toggle in the form of a torque applied to each of the lever arms thereof, greater axial forces and thus greater speed is applied to the movable platen during the initial portion of the clamping cycle when high speed is desired. Similarly, lower axial forces are imparted and thus lower speeds during the final approach when low speed is desired. Additionally, the hydraulic toggle of the present invention does not impart high side loads on the platen bearings since it does not apply large forces in a direction perpendicular to the direction of motion of the movable platen, and thus results in lower wear of the platen bearings. Furthermore, it can be seen that the improved clamping device of the present invention provides an extremely compact mechanism since the actuator and linkage are combined in a unitary structure.

Although described in terms of an injection molding machine, it would be apparent to those skilled in the art that the invention hereinabove described can also be utilized in diecasting machines, blow molding machines, or in any other apparatus wherein one member is moved relative to another and that movement is desirably a rapid one to reduce the time between an extreme open position and an extreme closed position.

While particular embodiments of the invention have been illustrated and described, it will be apparent to those skilled in the art that various changes and modifications can be made without departing from the spirit and scope of the invention, and it is intended to cover in the appended claims all such changes and modifications that are within the scope of this invention.

I claim:

1. In a clamping device for moving a movable member into cooperative engagement with a first cooperating stationary member, said movable member having a front and rear side and being connected through a link system to a second stationary member spaced from said first stationary member and positioned facing the rear side of said movable member, said moving and stationary members having their major faces substantially parallel and said moving member being supported for linear movement toward and away from said first cooperating stationary member, the improvement comprising:
  a. a first link member having a first end and a second end spaced from said first end, said first end being pivotally attached to the rear side of said movable member;
  b. a second link member having a first end and second end spaced from said first end, said first end being pivotally attached to said second stationary member;
  c. said second end of said first link member being pivotally attached to said second end of said second link member attached to form a knee joint; and
  d. a rotary hydraulic actuator positioned at said knee joint for applying oppositely directed torques to the ends of each of said links at said joint to thereby change the included angle between said links and thus move said movable member relative to said stationary members.

2. In a mold-clamping device for moving a movable member carrying one part of a two-part mold into engagement with a first stationary member carrying the second part of said mold, said movable member having a front and rear side and being connected through a link system to a second stationary member and positioned facing the rear side of said movable member, said moving and stationary members having their major faces substantially parallel, and said moving member being supported for linear movement toward and away from said first cooperating stationary member, the improvement comprising:
  a. a first link member having a first end and a second end spaced from said first end, said first end being pivotally attached to the rear side of said movable member;
  b. a second link member having a first end and second end spaced from said first end, said first end being pivotally attached to said second stationary member;
  c. said second end of said first link member being pivotally attached to said second end of said link member to form a knee joint; and
  d. a rotary hydraulic actuator positioned at said knee joint for applying oppositely directed torques to the ends of each of said links at said knee joint to thereby change the included angle between said links and thus move said movable member relative to said stationary members.

3. The device of claim 2 wherein said rotary hydraulic actuator is integral with said first and second links and defines said knee joint.

4. The device of claim 3 wherein one of said links is attached to a cylindrical pivot which carries a pair of outwardly directed, radially extending vanes and the other of said links is attached to a ring member concentric with said pivot, said ring member having an inner diameter greater than the outer diameter of said pivot, said vanes contacting the inner surface of said ring member, a pair of stops diametrically positioned on the inner surface of said ring and extending to said pivot to define a pair of arcuate chambers therebetween and limit the relative rotation between said first and said second links, and means for selectively introducing hydraulic fluid under pressure to either side of said vanes to cause said vanes to move relative to said stops and thereby impart relative rotation between said links about said knee joint.

5. The device of claim 4 wherein said hydraulic fluid is introduced through bores provided in said pivot.

6. The device of claim 5 wherein said vanes and said stops include spring-biased sealing means to prevent leakage of hydraulic fluid around the ends thereof.

7. In an injection molding machine including an injection system for injecting fluid material into a mold and incorporating a mold-clamping device for moving a movable member into cooperative engagement with a first cooperating stationary member, said movable member having a front and rear side and being connected through a link system to a second stationary member spaced from said first stationary member and positioned facing the rear side of said movable member, said moving and stationary members having their major faces substantially parallel and said moving member being supported for linear movement toward and away from said first cooperating stationary member, the improvement comprising:
  a. a first link member having a first end and a second end spaced from said first end, said first end being pivotally attached to the rear side of said movable member;
  b. a second link member having a first end and second end spaced from said first end, said first end being pivotally attached to said second stationary member;
  c. said second end of said first link member being pivotally attached to said second end of said second link member attached to form a knee joint; and
  d. a rotary hydraulic actuator positioned at said knee joint for applying oppositely directed torques to the ends of each of said links at said joint to thereby change the included angle between said links and thus move said movable member relative to said stationary members.

8. The injection molding machine of claim 7 wherein said rotary hydraulic actuator is integral with said first and second links and defines said knee joint.

9. The injection molding machine of claim 8 wherein one of said links attached to a cylindrical pivot which carries a pair of outwardly directed, radially extending vanes and the other of said links is attached to a ring member concentric with said pivot, said ring member having an inner diameter greater than the outer diameter of said pivot, said vanes contacting the inner surface of said ring member, a pair of stops diametrically positioned on the inner surface of said ring and extending to said pivot to define a pair of arcuate chambers therebetween and limit the relative rotation between said first and second links, and means for selectively introducing hydraulic fluid under pressure to either of said arcuate chambers to cause said vanes to move relative to said stops and thereby impart relative rotation between said links about said knee joint.

10. The injection molding machine of claim 9 wherein said hydraulic fluid is introduced through bores provided in said pivot.